United States Patent [19]

Petersen

[11] 4,048,911
[45] Sept. 20, 1977

[54] AIR SUPPLY APPARATUS

[76] Inventor: Ross K. Petersen, 5211 Lakeland Ave., Minneapolis, Minn. 55429

[21] Appl. No.: 709,551

[22] Filed: July 29, 1976

[51] Int. Cl.$^2$ .............................................. F24F 7/00
[52] U.S. Cl. .......................................... 98/39; 55/337
[58] Field of Search ................ 55/385 B, 337, 406, 55/456; 180/54 A, 54 D; 296/28C; 98/39, 2.11, 2.14, 37, 64, 18; 415/208, 209; 417/424

[56] References Cited

U.S. PATENT DOCUMENTS

| | | | |
|---|---|---|---|
| 1,438,553 | 12/1922 | Quam | 55/391 |
| 3,776,358 | 12/1953 | Williams | 296/28 C |
| 3,868,896 | 3/1975 | Doll et al. | 55/385 |
| 3,973,937 | 8/1976 | Petersen | 55/457 |

FOREIGN PATENT DOCUMENTS 501,715  4/1954  Canada ................................. 98/40

Primary Examiner—William E. Wayner
Assistant Examiner—R. J. Charvat
Attorney, Agent, or Firm—Burd, Braddock & Bartz

[57] ABSTRACT

An apparatus operable to separate particulates, as dirt, dust and foreign materials, from air and deliver clean air to the operator's compartment of a tractor cab. The apparatus has a motor-driven fan which moves air through a chamber surrounded with a cylindrical casing. The air moves through the chamber in a circumferential spiral direction whereby the particulates separate to an annular outside zone. Spaced inclined vanes direct the central core of clean air to a clean air passage and the annular zone of air carrying particulates to an annular air discharge opening. Clean air is directed to a fiber filter which filters fine particulates from the air and disperses the air to the operator's compartment.

20 Claims, 5 Drawing Figures

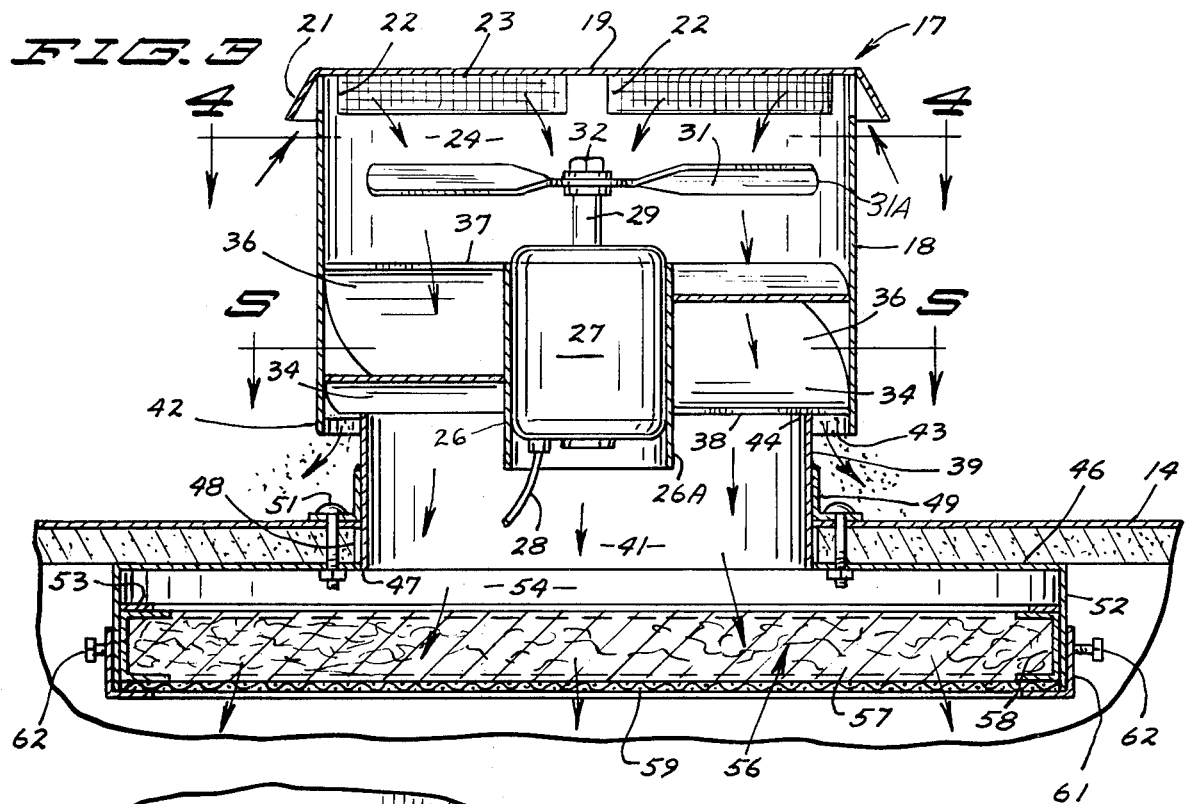
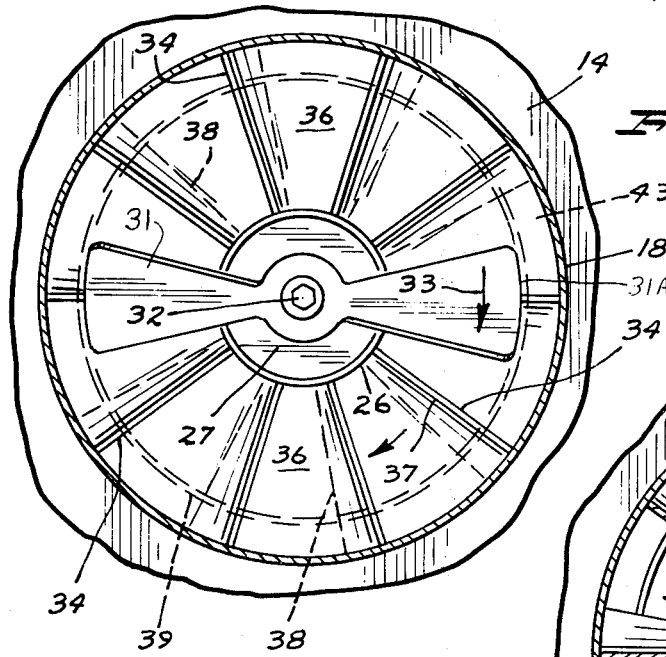
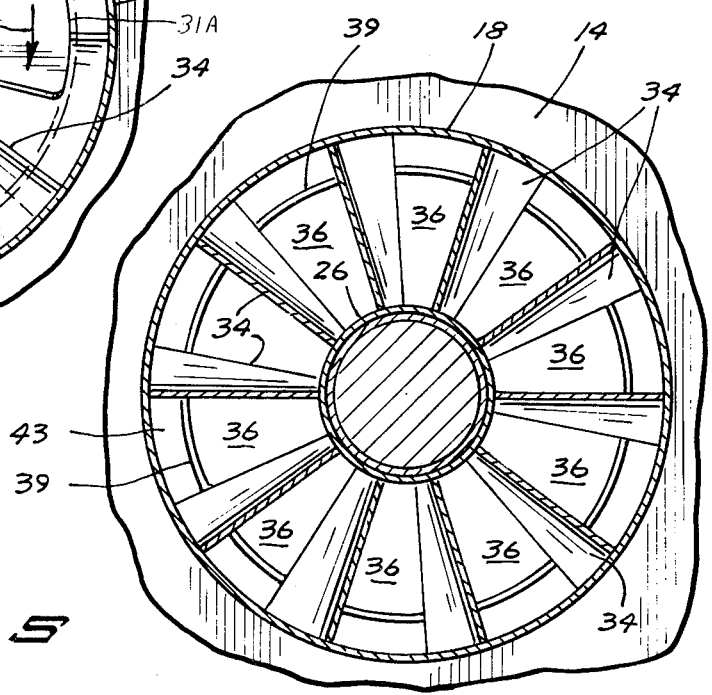

AIR SUPPLY APPARATUS

BACKGROUND OF INVENTION

Agricultural equipment, construction machines, street sweepers, and like machines are provided with enclosures or cabs to separate the operators of these machines from the outside dirty air. Air processing and ventilating systems have been used with the cabs to provide clean cool air to the inside operator's compartment of the cabs. Examples of vehicle cabs having air ventilating units as described are Grasseler in U.S. Pat. No. 3,532,377 and Doll et al. in U.S. Pat. No. 3,868,896. The Grasseler air treating unit uses a motor-driven fan to move air through a water spray and filter. Air-borne particulates are collected in the water and filter. The Doll et al. air ventilating structure is part of the roof of the cab and uses a pair of motor-driven blowers to force air through fiber-like filters.

Fans having motor-driven blades are used to deliver filtered air to desired locations. Frame structures mount the motors in the center of the fans so that the drive shafts of the motors can be used to support the fan blades. Fiber filters carried by the frame structure and located downstream of the blades separate foreign matter from the air. Examples of this type of filter fans and air cleaning apparatus are disclosed by de Bothezat in U.S. Pat. No. 1,794,447; Steinmetz in U.S. Pat. No. 3,407,570; Jackson in U.S. Pat. No. 3,362,416 and Kile in U.S. Pat. No. 3,593,499.

SUMMARY OF INVENTION

The invention is related to an apparatus operable to separate and discharge air-borne foreign matter, as particulates including dust, dirt and snow, to the outside environment and supply clean air to a desired location. The apparatus has a casing defining a chamber. An electric motor carrying a fan located in the chamber operates to move air through the chamber. The air moves in a circumferential spiral direction whereby foreign matter carried by the air is separated by centrifugal force into an annular zone located adjacent the casing wall. All of the air flows through passages between inclined vanes. The vanes support the motor on the casing. The passages between adjacent vanes are open to an annular air and foreign matter discharge opening which directs the air and foreign matter in the annular zone to the outside atmosphere. Clean air is carried by a collar to a fiber filter. Frame structure releasably supports the filter so that it can be removed.

The entire apparatus is mounted on the roof of an enclosure, as a vehicle cab, with a mount assembly. The collar extends through a hole in the roof. The mount assembly has an annular member fixed to the collar and engageable with the top of the roof. A plate on the inside of the roof surrounds the collar and is connected to the annular member with releasable fasteners. This mount assembly permits the air cleaning apparatus to be mounted on numerous types of structures without alerting the apparatus or structures.

An object of the invention is to provide a low cost air cleaning apparatus that efficiently separates foreign matter from air by centrifugal force, and discharges separated foreign matter to the outside atmosphere and discharge clean air to a desired location. Another object of the invention is to use a motor-driven fan in combination with inclined vanes to move and direct air in a circumferential or circular direction to separate foreign matter from the air. A further object of the invention is to provide a unitary air cleaning apparatus that is secured together with internal vanes. Yet another object of the invention is to provide an air cleaning apparatus with a central clean air discharge passage formed by a passage within a collar and an annular foreign matter and air discharge opening formed by the collar and an outside casing in conjunction with a motor-driven fan and vanes to move the air within the casing chamber in a circumferential or circular direction. These and other objects and advantages of the air cleaning apparatus are embodied in the instant invention as hereinafter shown and described.

DESCRIPTION OF THE DRAWINGS

FIG. 3 is an enlarged sectional view taken along the line 3—3 of FIG. 2;

FIG. 4 is a sectional view taken along the line 4—4 of FIG. 3; and

FIG. 5 is a sectional view taken along the line 5—5 of FIG. 3.

DETAILED DESCRIPTION OF PREFERRED EMBODIMENT OF INVENTION

Figure 1:
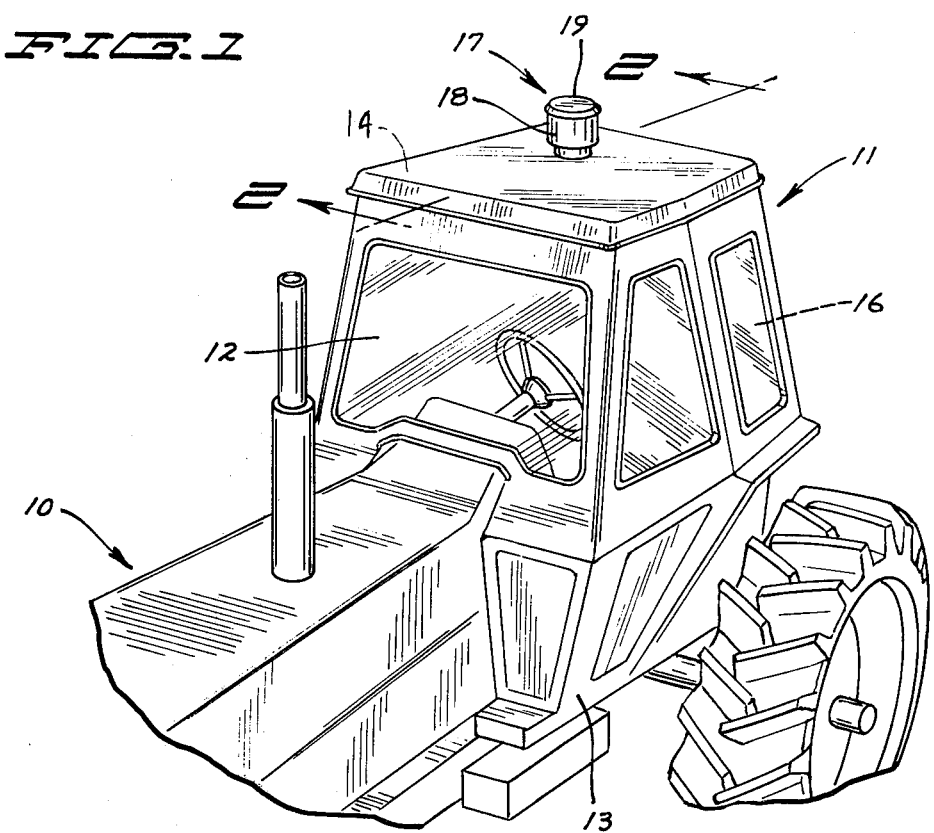
FIG. 1 is a fragmentary perspective view of an agricultural tractor having a cab enclosure equipped with the clean air supply apparatus of the invention.
Figure 2:
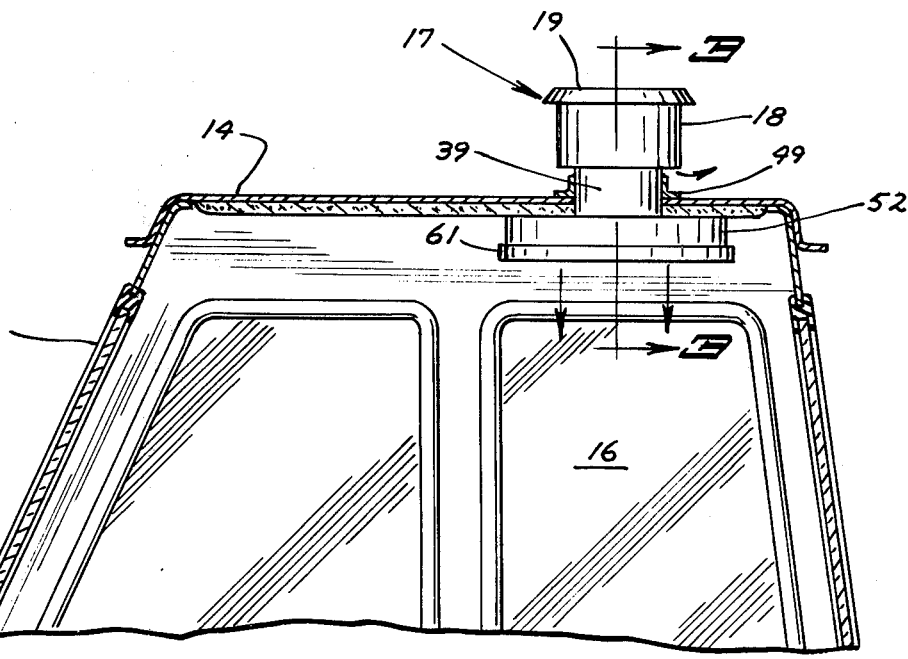
FIG. 2 is an enlarged sectional view taken along the line 2—2 of FIG. 1.

Referring to FIG. 1, there is shown an agricultural tractor indicated generally at 10 equipped with a cab enclosure 11. Enclosure 11 is a housing structure that can be removably or permanently mounted on the rear of the tractor to provide a chamber or compartment 16 for the operator of the tractor. The enclosure 11 has a front windshield 12 and side door 13 which permits the operator to enter the driver's compartment 16. The top of the enclosure has a generally rectangular flat roof 14 which insulates the driver's compartment from the outside environment. A clean air supply apparatus of the invention, indicated generally at 17, is mounted on the roof 14 and operates to supply clean air to the driver's compartment 16 and discharge air and particulates, as dust, dirt, snow or the like, to the atmosphere outside the enclosure 11.

The clean air supply apparatus 17 is hereinafter described in conjunction with a cab enclosure for a tractor. The apparatus 17 can be used with other types of vehicles including combines, cotton and corn pickers, construction and mining vehicles, street sweepers, trucks, tractors, earth moving equipment, cranes, logging tractors and trailers, and structures, as barns, houses, cabins, and factories.

Referring to FIGS. 3-5, the clean air supply apparatus 17 has an outside cylindrical casing or housing 18 attached to a transverse top wall or cover 19. Cover 19 has an annular outwardly and downwardly directed side flange 21. Connecting means, as nuts and bolts (not shown), are used to releasably attach cover 19 to the top of casing 18. The upper portion or first end of casing 18 has a plurality of arcuate inlet openings 22 located under the flange 21. Screens 23 mounted on casing 18 are located over the openings 22 to prevent large articles or particulates from entering chamber 24 surrounded by casing 18.

A cylindrical sleeve 26 is located in the center portion of the lower part of chamber 24. Sleeve 26 has an upright axis that coincides with the central axis of casing 18. An electric motor 27 is mounted inside of sleeve 26. Motor 27 can be a two or more speed electric motor. Power is supplied to motor 27 via electric cables or lines 28. The cables 28 are connected to suitable switch structure (not shown) and the battery of the vehicle. The switch structure can be two speed on and off switch mounted on the control panel of tractor 10 within reach of the operator. Motor 27 has an upwardly directed drive shaft 29. A transverse blade or fan 31 is secured to the upper end of shaft 29 with a nut 32. Fan 31 is located in the mid-portion of chamber 24. As shown in FIG. 4, fan 31 has two outwardly directed angularly inclined propellers. Each propeller has an outer end 31A that is spaced from the inside of casing 18. End 31A of each propeller is vertically aligned with a cylindrical member 39 so that the distance between end 31A and the casing 18 is about equal to the radial width of the annular air outlet passage 43. On operation of motor 27, the fan 31 is driven in the direction of the arrow 33 to draw air through the inlet openings 22 into the chamber 24 and pump the air through the chamber 24.

A plurality of circumferentially spaced helical elements or vanes 34 are secured to the casing 18 and sleeve 26. The vanes 34 support the casing 26 in the center area of the chamber 24. Each vane 34 is inclined in the forward direction or direction of movement of the air in chamber 24. Adjacent vanes 34 are spaced from each other providing passages 36 in communication with the chamber 24. Each vane 34 has an upper leading edge 37 and a lower trailing edge 38. The leading and trailing edges 37 and 38 of adjacent vanes 34 are circumferentially spaced relative to each other so that portions of the vanes 34 overlap each whereby the air flowing through the passages 36 moves in a circumferential spiral path.

As shown in FIGS. 3 and 5, a cylindrical member or collar 39 extends downwardly from the bottom of vanes 34. Collar 39 has a passage or clean air outlet 41 in communication with the lower portions of passages 36. Casing 18 has a downwardly directed annular lip 42 or second end that extends below the transverse plane of the top edge of collar 39. Lip 42 has a diameter larger than the diameter of collar 39 and forms therewith the annular outlet air passage 43. As shown in FIG. 5, passage 43 is in communication with outside arcuate portions of the passages 36 between the vanes 34. The lower or trailing edges 38 of vanes 34 are secured by welds 44 to the upper edge or first end of collar 39.

Referring to FIG. 3, an annular flat plate 46 is located in engagement with the inside of top wall 14. Plate 46 can have a square or rectangular shape. Top wall 14 is shown as having an outside metal covering and an inside insulative sheet. Other types of top wall structure can be used to enclose the top of the cab enclosure 11. Plate 46 has a hole 47 accommodating the lower end of the collar 39. Plate 46 is not attached to collar 39. The collar 39 projects through a hole 48 in roof 14. An annular L-shaped ring 49 is secured by weld to the midsection of the outside of collar 39. Ring 49 has a plurality of holes accommodating a plurality of nut and bolt assemblies 51. Nut and bolt assemblies 51 clamp the plate 46 and ring 49 to opposite sides of the roof 14. The ring 47 being movable relative to collar 39 permits the clean air supply apparatus to be mounted on various types and sizes of roofs.

The outer peripheral edge of plate 46 is secured to a downwardly directed flange or rim 52. Rim 52 has an inwardly directed lip 51 spaced below the plate 46. The space between the horizontal plane of the lip 53 and plate 46 is a plenum chamber 54 for receiving the air that flows through the passage 41 of collar 39. An air filter indicated generally at 56 is positioned within the rim 52 and engages the lip 53. Filter 56 comprises a filtering media 57 such as glass fibers and the like and is surrounded by a peripheral U-shaped frame 58. A screen 59 is located adjacent a lower side of filter 56. The filter 56 and screen 59 are held on the ring 52 with an L-shaped or right angle frame 61. Frame 61 is releasably mounted on rim 52 with a plurality of fasteners 62 such as bolts, set screws or the like. The bolts 62 can be removed thereby permitting the frame 61 to be lowered from the rimg 52. The screen 59 and filter 56 can then be retracted from the rim 52 thereby facilitating the cleaning and replacement of the filter.

In use, the operator of the vehicle 10 connects the electric motor 27 to the battery with a suitable switch on the control panel of the vehicle. Electric motor 27 rotates the fan 31 which in turn moves air through the chamber 24. The air moves through the inlet openings 22 and is initially separated from the large particles such as straw, chaff and the like by screen 23. The rotating fan 31 moves the air in a circumferential or spiral direction whereby the heavier particles are moved in a radial outward direction into engagement with the inside wall of casing 18. The circumferentially or circular moving air moves downwardly into the spiral passages 36. The passages 36, being inclined downwardly, increase the centrifugal action and deflect all of the air into a circumferential direction, thereby increasing the centrifugal forces acting on the particulates carried by the air. The air carrying the particulates is located in an annular zone or ring adjacent the inside of the wall 18. This air and the particulates carried by the air are expelled through the annular outlet passage 43 to the atmosphere outside of the roof 14. The inner core of air is the clean air. This air flows downwardly through the passage 41 into the plenum chamber 54. Plenum chamber 54 extends over the entire top of the filter 56 and provides for an even flow of air through the filter 56. The filter 56 functions to remove the fine particulates, as dust and pollens, from the air before the air is discharged into driver's compartment 16.

The clean air supply apparatus can be mounted on the roof of a cab by cutting an appropriate hole in the roof of the cab to accommodate the lower end of the collar 39. The ring 49 rests on top of the cab. A suitable gasket or sealing material can be interposed between the ring 49 and the top of roof 14 to prevent water leakage into the compartment 16. The nut and bolt assemblies 51 clamp the ring 49 and plate 46 to opposite sides of roof 14.

The filter 56 is readily removable from the flange 52. The fastener 62 are released to permit the frame 61 to be removed from rim 52. The filter 56 and the covering screen 59 can then be removed from the rim 52 for cleaning, repair or replacement.

While there has been shown and described a preferred embodiment of the clean air supply apparatus of the invention, it is understood that changes in materials, structures, and proportions can be made by those skilled in the art without departing from the invention.

The embodiments of the invention in which an exclusive property or privilege is claimed are defined as follows:

1. An apparatus for supplying air to a location comprising: a casing surrounding a chamber, said casing having a first end, a second end, and at least one air inlet opening open to the chamber to allow outside air to flow into the chamber; means for covering the first end of the casing, a plurality of stationary inclined vanes located in the chamber secured to the casing, adjacent vanes being spaced from each other to form passages open to the chamber and the second end of said casing, a rotatable fan located in the chamber between the vanes and means for covering the first end of the casing, motor means for rotating said fan whereby air is moved through the air inlet opening into the chamber and through the chamber in a circular path thereby concentrating particulates in an outer zone of air moving through the chamber and passages, means mounting the motor means in the central portion of the chamber, and a collar located adjacent the second end of the casing providing a clean air outlet passage and an air discharge opening, said outer zone of air and particulates being discharged through said air discharge opening and the remaining air being discharged through the clean air outlet passage.

2. The apparatus of claim 1 wherein: each vane has a radial leading edge and a radial trailing edge.

3. The apparatus of claim 2 wherein: the leading and trailing edge of adjacent vanes are circumferentially spaced from each other and opposite portions of adjacent vanes are in an overlapped relation.

4. The apparatus of claim 1 wherein: the fan has a plurality of blades, each blade having an outer end spaced radially inwardly from the casing, said outer end being located in general axial alignment with the wall of the collar.

5. The apparatus of claim 1 wherein: said means mounting the motor means in the central portion of the chamber includes means attached to the vanes.

6. The apparatus of claim 5 wherein: said means attached to the vanes is a cylindrical sleeve having an end portion extended into the clean air outlet passage.

7. An apparatus for supplying air to a compartment formed by a structure having a roof provided with a hole for accommodating a part of the apparatus comprising: a cylindrical casing having a first end and a second end, said casing surrounding a chamber, a wall covering the first end of the casing, said first end having air inlet openings open to the chamber allowing outside air to flow into the chamber, a sleeve located in the chamber, a plurality of inclined vanes secured to the sleeve and casing to support the sleeve on the casing, adjacent vanes being spaced from each other to form passages open to the chamber and the second end of the casing, a cylindrical member having an air outlet passage and a first end secured to portions of the vanes located adjacent the second end of the casing, said first end of the cylindrical member having a diameter smaller than the diameter of the second end of the casing whereby the first end of the cylindrical member is spaced from the casing providing an annular air outlet opening, an electric motor mounted in the sleeve, a fan located in the chamber connected to the motor to rotate on operation of the motor to draw outside air and particulates through the air inlet openings into the chamber, move the air in the chamber in a circular path thereby concentrating particulates in an outer annular zone of the air moving through the chamber, and moving the air through the passages between the vanes, said outer annular zone of air and particulates being discharged through the annular air outlet opening to the outside air and the inner clean air being directed through the air outlet passage, said cylindrical member having a second end locatable in the hole in the roof, means for attaching the cylindrical member to the roof for filtering the air flowing from the air outlet passage, said means for attaching the second end of the cylindrical member to the roof including a plate engageable with the roof, a flange surrounding and attached to the plate, said air filter means comprising an air filtering media and a frame surroundng the filtering media, and removable means mounted on the flange to hold the air filter means on the flange.

8. The apparatus of claim 7 including: open screen means mounted on the casing covering the inlet openings to prevent large particulate matter from entering the chamber.

9. The apparatus of claim 7 including: a lip attached to the flange to space the air filtering means from the plate to provide a plenum chamber between the air outlet passage and the air filtering means.

10. The apparatus of claim 7 wherein: the sleeve has an end extended into the air outlet passage.

11. The apparatus of claim 7 wherein: each vane has a radial leading edge and a radial trailing edge.

12. The apparatus of claim 11 wherein: the leading and trailing edge of adjacent vanes are circumferentially spaced from each other and opposite portions of adjacent vanes are in an overlapped relation.

13. The apparatus of claim 7 wherein: the fan has a plurality of blades, each blade having an outer end spaced radially inwardly from the casing, said outer end being located in general axial alignment with the wall of the cylindrical member.

14. The apparatus of claim 7 wherein: the means for attaching the cylindrical member to the roof includes an annular member surrounding and secured to the cylindrical member, and connector means engageable with the plate and annular member for clamping the plate and annular member on the roof.

15. An apparatus for supplying air to a location comprising: a casing having a first end and a second end, said casing surrounding a chamber, a wall covering the first end of the casing, said first end having at least one air inlet opening open to the chamber allowing outside air to flow into the chamber, a sleeve located in the chamber, a plurality of inclined vanes secured to the sleeve and casing to support the sleeve on the casing, adjacent vanes being spaced from each other to form passages open to the chamber and the second end of the casing, a cylindrical member having an air outlet passage and a first end secured to portions of the vanes located adjacent the second end of the casing, said first end of the cylindrical member having a diameter smaller than the diameter of the second end of the casing whereby the first end of the cylindrical member is spaced from the casing providing an air outlet opening, a motor mounted in the sleeve, a fan located in the chamber connected to the motor to rotate on operation of the motor to draw outside air and particulates through the air inlet openings into the chamber, move the air in the chamber in a circular path thereby concentrating particulates in an outer annular zone of the air moving through the chamber, and moving the air through the passages between the vanes, said outer annular zone of air and particulates being discharged through the air outlet opening to the outside air and the inner clean air being directed through the air outlet passage.

16. The apparatus of claim 15 including: open screen means mounted on the casing covering the inlet opening to prevent large particulate matter from entering the chamber.

17. The apparatus of claim 15 wherein: the sleeve has an end extended into the air outlet passage.

18. The apparatus of claim 15 wherein: each vane has a radial leading edge and a radial trailing edge.

19. The apparatus of claim 18 wherein: the leading and trailing edge of adjacent vanes are circumferentially spaced from each other and opposite portions of adjacent vanes are in an overlapped relation.

20. The apparatus of claim 15 wherein: the fan has a plurality of blades, each blade having an outer end spaced radially inwardly from the casing, said outer end being located in general axial alignment with the wall of the cylindrical member.

* * * * *

UNITED STATES PATENT AND TRADEMARK OFFICE
CERTIFICATE OF CORRECTION

PATENT NO. : 4,048,911

DATED : September 20, 1977

INVENTOR(S) : Ross K. Petersen

It is certified that error appears in the above-identified patent and that said Letters Patent are hereby corrected as shown below:

Column 1, line 59, "alerting" should be -- altering --.

Column 3, line 68, "51" should be -- 53 --.

Column 4, line 14, "rimg" should be -- rim --.

Signed and Sealed this

Sixth Day of December 1977

[SEAL]

Attest:

RUTH C. MASON
Attesting Officer

LUTRELLE F. PARKER
Acting Commissioner of Patents and Trademarks